March 7, 1944.  E. C. HORTON  2,343,843
WINDSHIELD WIPER BLADE
Filed Nov. 24, 1941
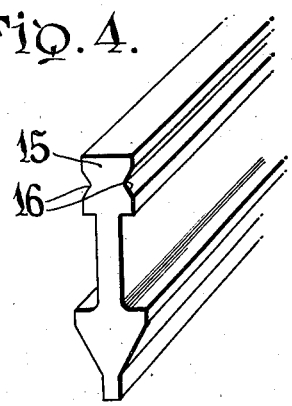
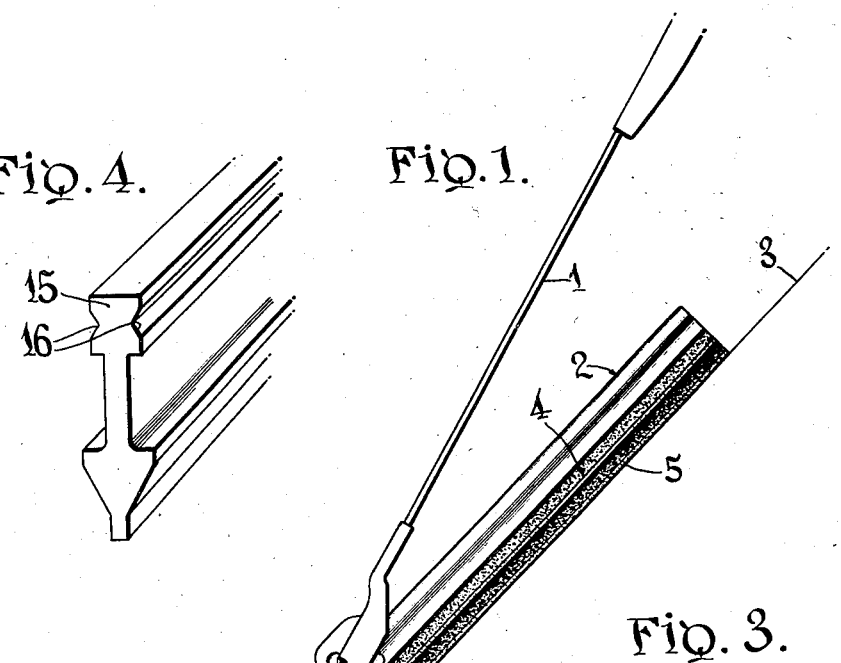
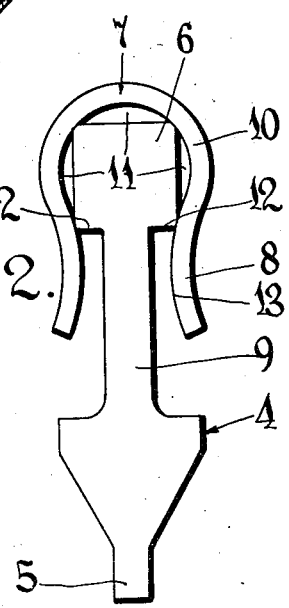
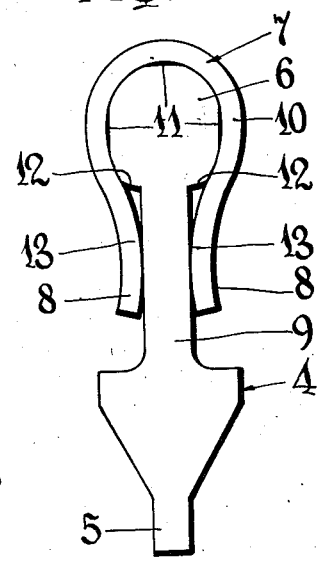
INVENTOR
Erwin C. Horton,
BY
Beau, Brooks, Buckley & Beau.
ATTORNEYS Patented Mar. 7, 1944

2,343,843

UNITED STATES PATENT OFFICE 2,343,843

WINDSHIELD WIPER BLADE

Erwin C. Horton, Hamburg, N. Y., assignor to Trico Products Corporation, Buffalo, N. Y.

Application November 24, 1941, Serial No. 420,187

8 Claims. (Cl. 15—245)

This invention relates to a wiper blade and has particular reference to its manner of construction which enables the production of a practically true wiping edge for securing greater wiping efficiency in operation.

The wiping blade of the present day windshield cleaner comprises a rubber-like strip or squeegee and a reinforcing holder of channel formation. The channeled holder is shaped from sheet metal stock and folded over the back edge of the wiping strip with the sides of the channel clampingly embracing the sides of the resilient strip body. It sometimes happens in the mass production of wiper blades that the back or inner edge of the strip body is acted upon by the holder during the folding of the latter in a manner to squeeze or press the resilient body in an outward direction with respect to the channel. This outward movement of the resilient body is irregular and unguided and consequently it has the effect of distorting the wiping edge to throw portions of it out of a true common plane. This undesired action is more pronounced when the inner or back edge of the resilient strip body is formed with a bead or similar enlargement, the bead being subjected to an uncontrolled compression which transmits a distorting influence on the wiping edge, such distortion being secured by and when the sides of the channeled holders are finally brought into clamping embrace with the sides of the resilient body.

It is the object of the present invention to provide a wiping blade by which the performed accuracy in the wiping edge is maintained throughout the process of applying the channeled holder to the back edge of the strip.

In the drawing

Fig. 1 is a side elevation of the improved wiper blade operatively supported by its actuating arm;

Fig. 2 is a transverse section through the blade showing an intermediate step in the process of its manufacture;

Fig. 3 is a view similar to Fig. 2 but showing the completed wiper; and

Fig. 4 is a fragmentary perspective view of a modified wiping strip or body.

Referring more particularly to the drawing, the numeral 1 designates an actuating arm for the wiper blade 2 by which the latter is oscillated over the surface of the windshield indicated by the line 3.

In the former method of manufacture the channeled holder was applied over the rear or inner margin of the strip-like body with the sides of the holder being bent into clamping embrace with the web or sides of the squeegee body. During this bending operation the clamping pressure manifested itself in a more or less progressive manner from the inner marginal edge in an outward direction and therefore such inner marginal portion would be initially compressed and squeeze the body outwardly toward the wiping edge. This pressure application being unguided and uncontrolled, it frequently happened that the wiping edge would be deformed or misshaped by reason of the outward crowding of the material from which the body was formed, which deformation was later secured in a permanent manner when the sides of the holder were finally clamped upon the sides of the squeegee body.

The present invention aims to correct this condition. Accordingly, the wiper comprises a squeegee body 4 of strip-like form having a wiping edge 5 along one margin and an enlargement in the form of a bead 6 along the opposite or back marginal edge of the body. A channeled reinforcing holder 7 is placed over the marginal bead 6 with the sides 8 of the holder extending upon opposite sides of the web 9 of the strip-like body. The strip-like body is preferably formed of rubber or other resilient material and according to the present invention the bead 6 which is received within the channel of the holder is clampingly embraced by the base or bottom portion 10 of the channel so as to firmly anchor the squeegee body in the holder.

As shown in Fig. 2 the cross-sectional shape of the bead 6 is such as to provide clearance space indicated by the numerals 11 into which the excess bead material may be crowded as the holder compresses the bead during the clamping action. From the inspection of Figs. 2 and 3 it will be observed that in the former figure before the channel sides 8 actually contact the web 9 the bead is engaged clampingly at its corners by the holder, the general cross-sectional shape of the bead being substantially rectangular. Since the outer shoulders 12 are embraced by the inwardly converging portions 13 of the channel sides any further clamping pressure applied to the holder will be such as to hold the bead material against being crowded outwardly of the channel toward the wiper edge 5. Consequently, this excess bead body will be squeezed into the clearance space 11, as indicated in Fig. 3, and therefore when the channeled holder is folded to its final position where it preferably contacts the sides of the web 9 without any substantial amount of clamping pressure, the bead will find itself confined against outward expansion toward the wiping edge. By reason of this definite clearance ample provision is made to accommodate the compressed bead without the tendency of the rubbery body to crowd out in the channel to the detriment of the preformed accuracy of the wiping edge 5.

The wiping edge is therefore firmly clamped and anchored at the bead and any support given by the channel side walls 8 is primarily lateral with respect thereto although it is believed obvious that if there should be clamping pressure exerted by the channel side walls it will occur subsequent to the anchoring of the bead in the holder as above set forth, and since such anchorage insures the maintenance of the original preformed accuracy of the wiping edge an efficient wiper is assured when the blade is made by mass production methods.

In the embodiment shown in Fig. 4 a squeegee body has its bead 15 formed with lateral grooves 16 to provide additional clearance space into which the bead material may be squeezed when the holder is folded thereupon. In both forms of the invention it will be observed that definite provision is made to confine the bead material when the latter is compressed by the holder thereby preventing the rubbery body from being squeezed outwardly between the channel walls in a manner which may deform and thereby affect the original accuracy in the wiping edge.

The clearance space 11, 16, will preferably be of a size slightly greater than that actually required to receive the crowded excess of material so as to take ample precaution against deformation of the wiping edge.

While the foregoing description has been given in detail it is obvious that the embodiments depicted are merely illustrative of the inventive principles involved which may be incorporated in other physical embodiments without departing from the scope and spirit of the invention claimed.

What is claimed is:

1. A wiper blade comprising a resilient squeegee body of strip-like form having a wiping edge along one longitudinal margin and an anchoring enlarged bead along the other longitudinal margin, and a channeled holder having outwardly converging sides clampingly embracing the bead along its inner portion to compress it toward the bottom of the holder channel, the initial cross sectional shape of the bead being such as to afford a clearance recess for accommodating the crowded material when so compressed.

2. A wiper blade comprising a strip-like body having an anchoring enlargement along one longitudinal margin and its opposite margin provided with a straight wiping edge, and a channeled holder straddling the enlargement and having outwardly converging sides clampingly embracing the enlargement at its inner portion to hold the enlargement crowded toward the bottom of the channel, the initial cross sectional area of the enlargement being less than that of the embracing portion of the channel to provide clearance to receive such crowded material whereby the wiping edge is maintained straight, the sides of the channel extending beyond the enlargement on opposite sides of the strip-like body in contact therewith under relatively light embrace.

3. A wiper blade comprising a body having a wiping edge along one margin and an enlarged bead along the other margin joined to the body by offsetting shoulders, and a channeled holder having converging side portions clampingly embracing the shoulders against outward crowding of the body toward the wiping edge, the sides of the holder extending outwardly beyond the shoulders being free of clamping embrace on opposite sides of the body solely to give lateral support thereto.

4. A wiper blade comprising a body having a wiping edge along one margin, the opposite margin being joined to the wiping edge by a web and having an enlarged bead with longitudinal shoulders joining the web, and a channeled holder straddling the bead and having convergent sides engaging the shoulders under clamping pressure to compress the bead material back toward the bottom of the channel and against crowding out of the channel toward the wiping edge, the cross sectional area of the compressed bead being less than that of its embracing channel portion and the sides of the holder extending outwardly from the shoulders to give lateral support to the web independent of anchoring pressure.

5. A wiper blade comprising a body having a wiping edge along one margin, the opposite margin being joined to the wiping edge by a web and having a bead with longitudinal shoulders joining the web, and a channeled holder having outwardly convergent sides straddling the bead and engaging the shoulders as well as the back of the bead under clamping pressure to hold the bead material against crowding out of the channel toward the wiping edge, the holder having clearance provision within the channel inwardly of the convergent sides receiving the bead material as it spreads under pressure, the sides of the holder extending outwardly from the shoulders in relatively light contact with the web to give lateral support to the latter.

6. A wiper blade comprising a body having a wiping edge along one margin, the opposite margin being joined to the wiping edge by a web and having a bead with longitudinal shoulders joining the web, and a channeled holder having outwardly convergent sides straddling the bead and engaging the shoulders under clamping pressure exerted in a direction toward the bottom of the channel to force the bead material inwardly, the bead having a clearance recess therein to accommodate the crowded material and thereby prevent the latter from crowding out of the channel toward the wiping edge to deform the latter, the sides of the holder extending outwardly from the shoulders with a relatively light contact with the web to give lateral support thereto.

7. The method of making a wiper blade, consisting in folding the sides of a channeled holder over a longitudinal margin of a strip-like elastic body in a manner to have the clamping pressure applied initially at a point intermediate the longitudinal margins of the body and in a direction inwardly toward the bottom of the channel to confine the crowding of the body material toward the first margin within the holder.

8. The method of making a wiper blade consisting in applying a channeled holder having outwardly convergent sides over a longitudinal margin of a strip-like body which margin has an enlarged bead joined to a web portion by lateral shoulders, compressing the convergent sides initially into engagement with the shoulders while the back portion of the bead is seating on the bottom of the channel with sufficient clearance being left within the channel inwardly of said shoulders into which the bead material may flow upon further compression of the channel sides, and finally compressing the sides to flow the bead material into such clearance inwardly of said shoulders while bringing the sides outwardly of the shoulders into a relatively light embrace with the web portion to give lateral support to the latter.

ERWIN C. HORTON.